United States Patent [19]
Tsui et al.

[11] Patent Number: 4,705,422
[45] Date of Patent: Nov. 10, 1987

[54] MULTI-POSITION FIXTURE

[75] Inventors: Gary Tsui, Rosemead; Thomas Heimbigner, Bellflower, both of Calif.

[73] Assignee: CBC Industries, Inc., City of Commerce, Calif.

[21] Appl. No.: 894,632

[22] Filed: Aug. 8, 1986

[51] Int. Cl.[4] .................................................. F16B 7/06
[52] U.S. Cl. .......................................... 403/60; 403/78; 403/164
[58] Field of Search .................... 403/78, 60, 165, 155, 403/164; 464/112, 136

[56] References Cited

U.S. PATENT DOCUMENTS

| | | | |
|---|---|---|---|
| 1,442,921 | 1/1923 | Bockhoff | 464/136 |
| 2,977,776 | 4/1961 | Quinn | 464/136 X |
| 3,297,293 | 1/1965 | Andrews et al. | 248/361 |
| 4,431,352 | 2/1984 | Andrews | 410/101 |
| 4,592,686 | 6/1986 | Andrews | 403/164 X |

*Primary Examiner*—Andrew V. Kundrat
*Attorney, Agent, or Firm*—Beehler, Pavitt, Siegemund, Jagger, Martella & Dawes

[57] ABSTRACT

For lifting loads there is provided an eyebolt with an annular ring swivelly mounted on a stud so as to freely rotate in a horizontal plane through a full 360°. A lifting loop has oppositely disposed pivot pins in swivel engagement with the annular ring to allow the loop to pivot in a vertical arc as well as to rotate about the stud. The stud in turn is adapted to be anchored in fixed position to the load, whatever the load may be. Snap rings at free ends of the pivot pins serve to resist pulling the pins free of the annular ring when a heavy lifting force is applied to the lifting loop.

4 Claims, 3 Drawing Figures

MULTI-POSITION FIXTURE

The invention has reference to a multi-position fixture of a type adapted to be anchored to a load and used for one purpose or another such, for example, as lifting the load by use of a sling or fastening the load on the body of a truck or trailer for transportation. The multi-position fixture, moreover, is a versatile type of fixture adapted for great varieties and types of loads, relatively heavy loads in particular being advantageously served by the fixture. Contributing to the versatility of the fixture is a structure which provides a ring capable of swiveling throughout a complete 360-degree arc, and at the same time capable of being swung throughout an arc of substantially 180 degrees in a direction perpendicular to the 360 degree swivel arc, irrespective of the manner in which the fixture is attached to the load.

Among the objects of the invention is to provide a new and improved multi-position fixture for fixed attachment to a load, and which is provided with a tie ring, the ring, in company with a portion of the fixture being of a character permitting it to swing freely in different directions, depending to a degree on the direction which the tie needs to assume, and with virtually a minimum prospect of the ring being sprung free of engagement when under load.

Another object of the invention is to provide a new and improved multi-position fixture capable also by reason of its attachment of swinging throughout an arc perpendicular to the plane of rotation, the assembly of parts being relatively few in number and of rugged simple construction, making the fixture one of great dependability under a wide variety of circumstances.

Still another object of the invention is to provide a new and improved multi-position fixture having relatively few parts the fixture being of rugged construction, numerous of the parts being of conventional construction and assembly of the same being one wherein the cost of production can be kept relatively low.

Still another object of the invention is to provide a new and improved multi-position fixture of a design and construction enabling manufacturing operations to be held to substantially a minimum, thereby contributing appreciably not only to dependability in the assembled device but also economy.

Still further among the objects of the invention is to provide a new and improved multi-position fixture of a versatile character enabling it to be attached to any one of a great variety of loads and which is of construction enabling virtually all of the individual parts, once brought together in assembled condition, to be connected together in a manner holding them in their assembled condition until permanently fastened to the load in the selected location, the parts, moreover, being connected in a manner permitting them to be readily disassembled, and subsequently reassembled, where such assembly is of advantage.

With these and other objects in view, the invention consists of the construction, arrangement, and combination of the various parts of the device serving as examples only of one or more embodiments of the invention, whereby the objects contemplated are attained, as hereinafter disclosed in the specification and drawings, and pointed out in the appended claims.

Figure 1:
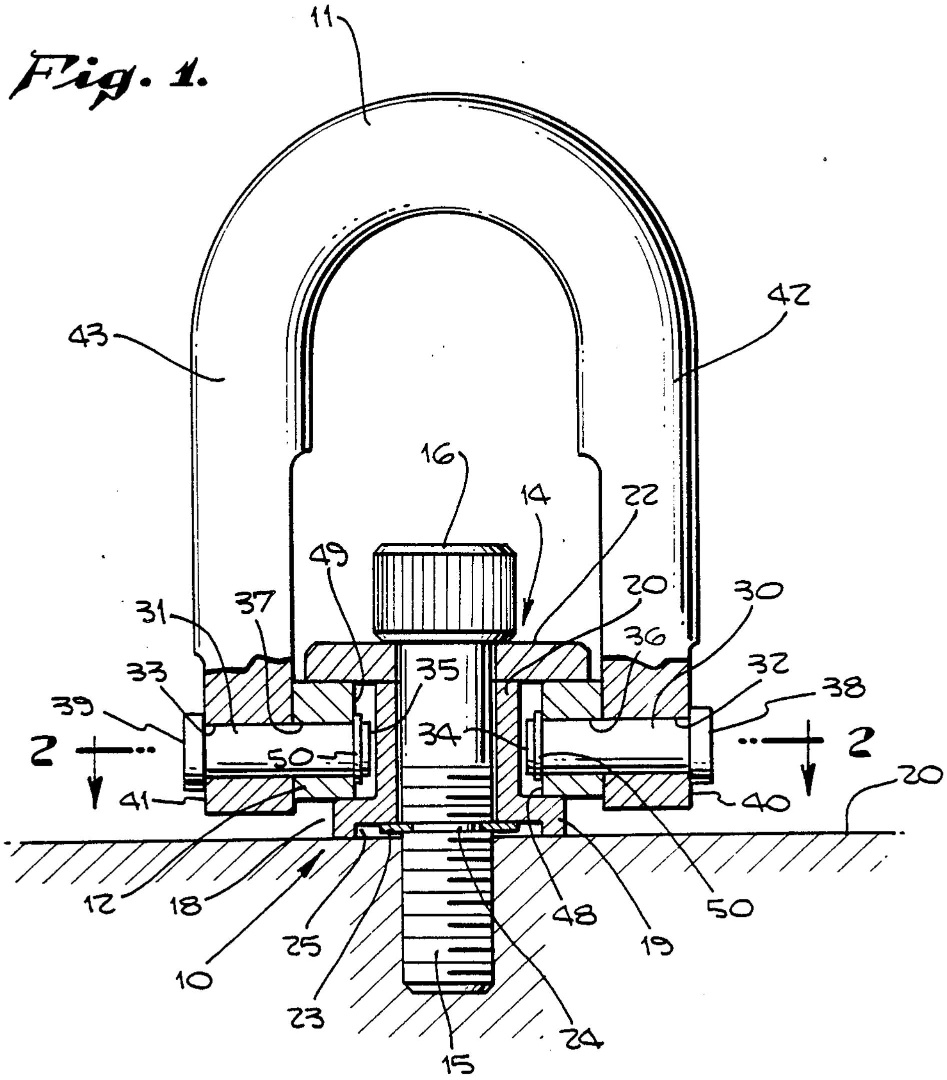
FIG. 1 is a side elevational view partially broken away.
Figure 2:
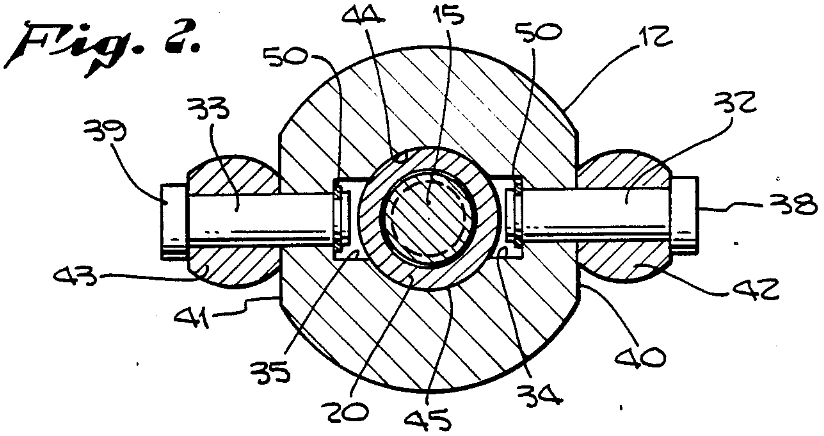
FIG. 2 is a cross sectional view on the line 2—2 of FIG. 1.

In one embodiment of the eyebolt chosen for the purpose of illustration, there is shown what may aptly be described as a multi-position fixture consisting of a load-engaging anchor assembly, indicated generally by the reference character 10, upon which a lifting loop 11 is mounted and contained by use of a retention ring 12 in a fashion enabling the lifting loop to pivot throughout a vertical arc of 180 degrees, as viewed in FIG. 1. At the same time the retention ring, and consequently the lifting loop can swivel in a plane usually horizontal throughout a full 360 degrees. Merely by way of example the load-engaging anchor assembly 10 is shown embedded in and anchored to a load 13 which can be a mass of metal adapted to attachment of a threaded stud 14.

Figure 3:
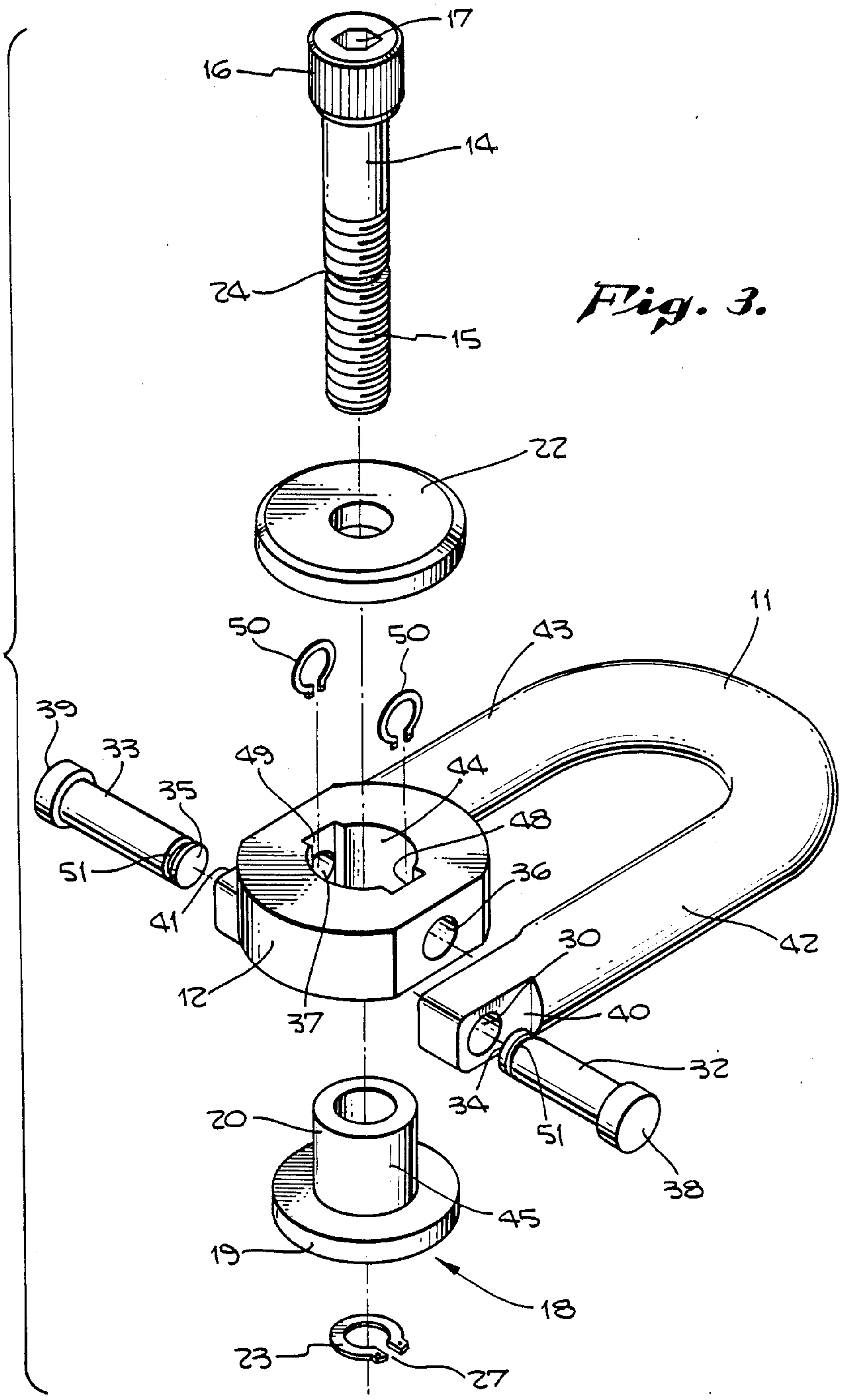
FIG. 3 is an exploded view of the parts prior to assembly.

The load-engaging anchor assembly 10 previously made reference to consists in part of the stud 14, the lower portion of which is a threaded shank 15, the upper end being provided with a head 16. To assist in tightening and loosening the stud from position, the exterior of the head may be knurled, as shown in FIGS. 1 and 3, and also provided with a hexagonal recess 17 for reception of an appropriate conventional hexagonal wrench.

For cooperation with the stud 14, there is provided a bushing 18. The bushing is provided with an multipurpose flange 19 one purpose of which is to serve as a bearing for engagement with the load. Extending outwardly from the flange is a sleeve 20, the flange and sleeve 20 being provided with a central bore 21 through which the threaded shank 15 of the stud 14 extends.

The retention ring 12, previously identified, extends around the sleeve 20 and is held in position by a washer 22 beneath the head 16, serving as a retention member.

At the end of the sleeve 20 opposite from the washer 22 is a clip in the form of an snap ring 23 lodged in an annular groove 24 in the threaded shank 15. A recess 25 on the underside of the flange 19 accommodates the snap ring in a position where it can clear an adjacent surface 26 of the load 13. By providing the snap ring 23 as described, the operating parts are held in the necessary assembled relationship during shipment and handling, prior to being anchored to the load, the parts, therefore, not being easily mislaid.

Should there be need to disassemble the parts of the load-engaging anchor assembly, the snap ring 23, provided with an open side 27 as shown in the exploded view FIG. 3, can be expanded and removed.

The loop 11, sometimes identified as a hoist ring, eyebolt, or U-bar, in order to provide an adequate safety factor, is preferably of forged steel. Shoulder pins 30 and 31 are provided and extend through bores 32 and 33 at free ends of the legs at the open end of the loop. Radially inwardly directed end faces 34 and 35 of the respective shoulder pins 30 and 31 are spaced from each other a distance something in excess of the outside diameter of the sleeve 20. For holding the shoulder pins in operative position, the ring member 12 is provided with diametrically opposite bearing recesses 36 and 37, the bearing recesses having a breadth slightly in excess of the diameter of the shoulder pins so that the pins are adapted to pivot freely within the recesses, the pins and recesses being in axial alignment.

To improve the ease of manufacture and assurance of continued performance under exceptional conditions the shoulder pins 30 and 31 are anchored in the assembly by a special structural arrangement. The the shoulder pins are assembled with respective heads 38 and 39 in snug engagement with outside surfaces 40, 41 of the legs 42, 43 of the loop 11. Free ends of the shoulder pins are substantially coincident with an annular inside wall 44 of the retention ring 12. In this position the end faces 34, 35 comfortably clear the exterior wall 45 of the sleeve 20.

For anchoring the shoulder pins 30, 31 in the assembly recesses in the form of slots 48 and 49 are cut into the retention ring 12 coincident with location of the respective recesses 36 and 37, the slots being wide enough to accommodate a snap ring 50. Annular grooves 51 in the respective shoulder pins accommodate the snap rings.

When assembling the parts the shoulder pins 30, 31 and the retention ring 11 are effectively trapped in the assembled condition by having the multi-purpose flange 19 serve also as a retention means on one side of the retention ring 12, acting in concert with the washer 22 serving as a retention means on the other side of the retention ring. At the same time the sleeve 20 overlies the inner ends of the shoulder pins and, with the help of the washer 22 and flange 19, close off access to the snap rings 50. It is also of consequence to note that the length of the sleeve 20 is something in excess of the thickness of the retention ring 12 so that the bearing flange 19 cannot be drawn into binding engagement with the retention ring when the stud 14 draws the flange 19 snugly against the surface 26 of the load 13. With this arrangement the retention ring remains free to swivel its full 360 degrees, enabling the lifting loop 11 likewise to swivel the full 360 degrees, while at the same time being capable of pivoting about the axis of the shoulder pins 30 and 31.

Although the load has been identified as a mass of metal, it should be appreciated that the shank of the stud can be as readily embedded in concrete or fastened in some other conventional manner to items such as large dies and fixtures, heavy machinery and structural members. The hoist ring assembly or swivel eyebolt, for such it is, can be as readily attached to mobile equipment, cargo slings, or virtually any kind of load which needs to be either lifted or to be tied in place.

Wherever there is need to disassemble the parts of the load-engaging anchor assembly, the clip 23, provided as shown with an open side 27, as shown in the exploded view, FIG. 3, can be expanded and removed.

Of still greater consequence are the slots 48 and 49 accommodating as they do the snap rings 50 and their respective annular grooves in the corresponding shoulder pins 30, 31. With Applicants' arrangement, the shoulder pins can be merely pushed into place without need for rotary orientation. The snap rings are merely dropped into the grooves and driven home for any position of rotation of the shoulder pins, unlike prior art where, because of having to align complementary drilled holes to accept a pin, assembly and reassembly of the parts requires appreciable expenditure of time as needed for bringing matching holes into register.

While a particular embodiment of the invention has been shown and described, it will be obvious to those skilled in the art that changes and modifications may be made without departing from the invention in its broader aspects, and therefore the aim of its appended claims is to cover all such changes and modifications as fall within the true spirit and scope of the invention.

What is claimed as new in support of Letters Patent is:

1. A multi-position fixture for attachment to a load comprising a load-engaging anchor means including a threaded stud, a retention means having a swivel engagement with the anchor means and adapted to rotate throughout substantially a full circle, a substantially arcuate lifting loop and a transversely disposed pivot structure having opposite shoulder pin elements respectively joined to said loop in a fixed spaced axial relationship with respect to each other, each said shoulder pin element having a captive end at a junction with the loop and a free end, said retention means comprising an annular ring member having opposite parallel faces and inside and outside walls and retention members adjacent opposite faces of said ring member, said ring member having bearing pockets on respective diametrically opposite sides extending between said walls, each pocket having a form and size complementary with respect to a corresponding free end of the shoulder pin element and locking means for the shoulder pin elements, said locking means comprising a recess for each bearing pocket located in the inside wall of the annular ring member in alignment with the corresponding bearing pocket and a releasable fastener for each recess, each recess having an initially open side and open ends, each recess and the corresponding shoulder pin element being receptive of one of said releasable fasteners, the initially exposed sides of said recesses being covered by one of said retention members, said loop having a path of movement throughout an arc of substantially a half circle for all positions of rotation of said annular ring member.

2. A multi-position fixture as in claim 1 wherein each said recess is a slot extending between the opposite parallel faces of the ring member.

3. A multi-position fixture as in claim 1 wherein each said recess is a slot extending between the opposite parallel faces of the ring member, and said retention means comprises the retention members for opposite faces of the ring member, said retention members having operative positions overlying corresponding opposite ends of the respective slots.

4. A multi-position fixture as in claim 3 wherein one of said retention members comprises a relatively central sleeve section extending into engagement with the other of said retention members and which occupies a position within the inside wall of the ring member overlying said slots whereby the ring member is captured by said retention members in a rotatable relationship.

* * * * *